Feb. 14, 1950     A. L. M. A. ROUY     2,497,374
CATALYZING COMBUSTION CHAMBER FOR DIESEL ENGINES

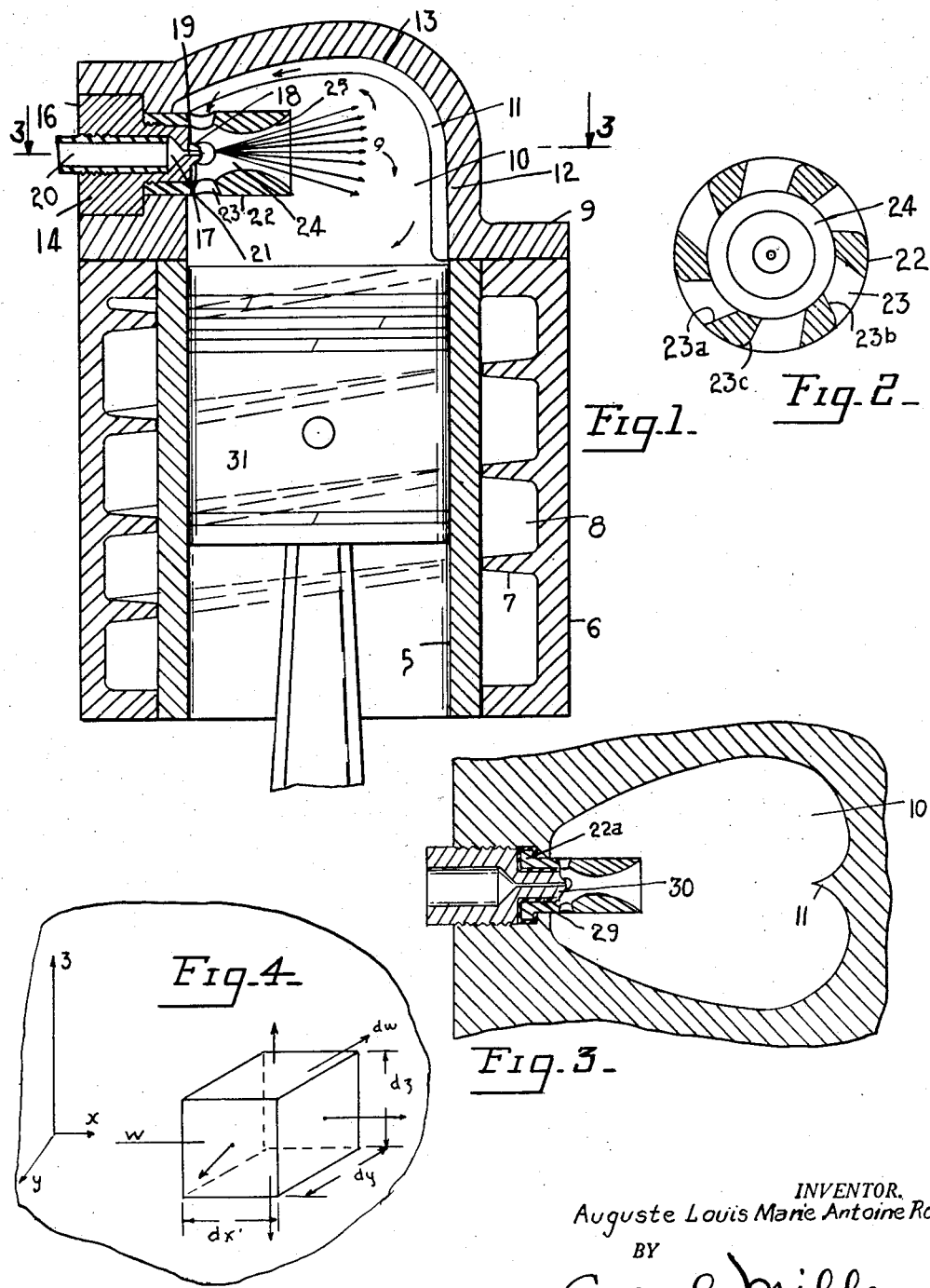

Filed Nov. 25, 1944     2 Sheets-Sheet 2

INVENTOR.
Auguste Louis Marie Antoine Rouy
BY
Carl Miller
ATTORNEY

Patented Feb. 14, 1950

2,497,374

UNITED STATES PATENT OFFICE 2,497,374

CATALYZING COMBUSTION CHAMBER FOR DIESEL ENGINES

Auguste Louis Marie Antoine Rouy, New York, N. Y.

Application November 25, 1944, Serial No. 565,145

3 Claims. (Cl. 123—33)

It is well known that maximum efficiency in the combustion of fuel supplied to Diesel engines finally depends upon the completeness of fuel combustion, providing the mechanical parts are constructed to operate smoothly and efficiently. It is also known that while improvements in fuel combustion may be gained by the use of methods which produce a turbulent action to the inflow of the fuel and air, these methods are not sufficient to produce full combustion of the fuel supplied to the engine combustion chambers. It is also known that turbulence may interfere with maximum efficiency, by cooling fuel mixture or gases, through great or excessive heat transfer, due to the coefficient of forced convection between the fuel gases and the walls of the combustion chamber, generated by the high relative velocities of the gases in respect with the cold walls of the combustion chamber.

One of the objects of the present invention is to provide a Diesel engine with means for advancing the chemical combination of air and fuel particles in progressive combustion, without smoke, and with maximum elimination of knocking noises.

It is also well known that the knocking effect in Diesel engines develops in the main from the low velocity of the propagation of the flames of combustion, which imposes on the mass of the enclosed fuel gases a resonant vibration, of one or of several nuclei of combustion. This first slows down the combustion and then comes an instantaneous explosion of the fuel contained in the combustion chamber, in suspension or otherwise.

By definite experiments I have established that the velocity of flame propagation is the principal cause of engine knocking, and that by increasing the velocity of flame propagation we may greatly reduce engine knocking, and possibly eliminate it.

It is also well known that the velocity or time-rate of a chemical combination, which takes place when different elements, in combinable relation, are brought together in the presence of the proper catalytic agent, is increased through the influence of the catalytic agent, which remains unaltered by the chemical change which takes place in the presence of the catalytic agent.

From profound research work and experimental inquiry I have reached the conclusion that the valence electrons of the catalyst atom are alone responsible for the acceleration of the chemical reaction which develops in their presence. After long use of a given catalyst I have found that its analysis does not show any chemical transformation or change, but a loss of valence corresponding to this loss of valence electrons.

I have also found it necessary to facilitate by every means the circulation and production of the free valence electrons, in order to increase the interchange of valence electrons between the atoms of the chemical compounds undergoing reaction, and thereby increase the velocity of the chemical reaction. It is known that the bombardment of an atom by an electron can remove from it an electron, then ionizing the atom, which then becomes positive and able to add a new electron to its system, representing the mechanics of the chemical reaction.

The probability of release of free electrons from an atom in lattice form, at the boundary of the material, depends upon the energy level. The elevation of temperature of the material facilitates greatly the liberation of free electrons and in the same way the presence, nearby the boundaries, of an electrostatic positive field is a powerful means of liberating free valence electrons.

One of the objects of the present invention is to apply this physical discovery in the functioning of a combustion chamber of a Diesel engine, so that better combustion, greater power output, elimination of smoke which signifies unconsumed fuel, and elimination of engine knocking noises, may be obtained.

Another object of the invention is to provide an internal combustion engine with an inner wall surface which forms a series of parabola, and is so arranged that a useful turbulence is developed for the fuel charge, which is injected into the compressed air supply of the combustion chamber.

A further object is to provide a fuel injection mixer which functions as a chemical catalyzing element or agent, and which thereby increases the velocity of chemical combination taking place in the form of combustion of the fuel hydrocarbons and the oxygen of the compressed air supply of the combustion chamber.

A still further object of the invention is to combine a nozzle with a catalytic mixer of a Diesel engine, in such manner that the air will spin through openings of the fuel nozzle and by frictional electrical influence with it accelerate the resulting chemical action, and maintain the catalytic nozzle or injector part in a condition of sustained efficiency.

A still further object of the invention is to provide a Diesel engine with a combustion chamber which is offset axially from the bore of the piston cylinder, so that the air compressed by the movement of the piston in its cylinder bore will spin in the chamber as the piston completes its compression stroke and discharges nearly all the air of the cylinder into the combustion chamber—thereby completing the mixing of the fuel charge with the compressed air supply, and sustaining the process of generating an electrostatic field through frictional action of the gases molecules between themselves.

With the above and other objects in view, the invention consists in certain method steps, combinations, constructions and arrangements of parts, fully described in the following specifications, and fully illustrated in the accompanying drawings, in which:

Fig. 1 is a vertical sectional view through the cylinder of a Diesel engine.

Fig. 2 is a detail cross sectional view, through the catalytic fuel injector, taken on an enlarged scale.

Fig. 3 is a horizontal sectional view through the combustion chamber, taken on line 3—3 of Fig. 1, looking in the direction of the arrows.

Figure 4:
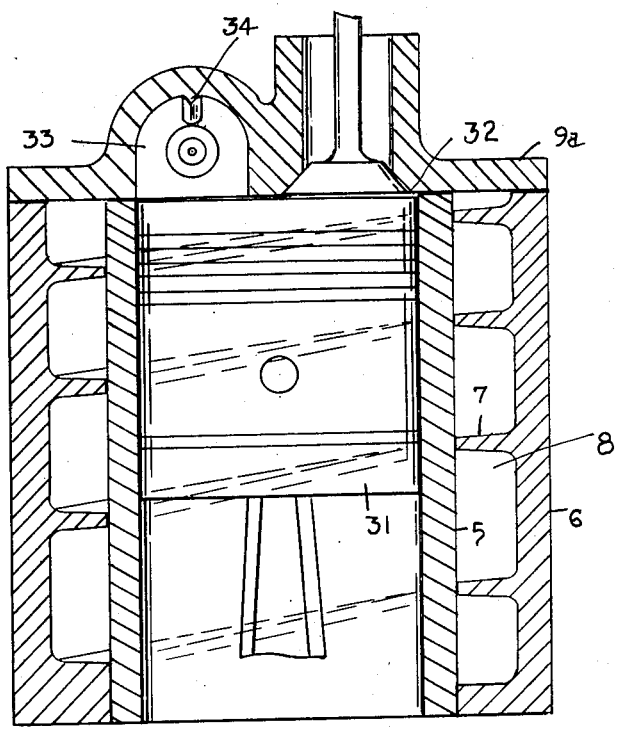
Fig. 4 is a vertical sectional view through a single cylinder of a Diesel engine, showing an offset combustion chamber.

Referring to the accompanying drawings, which are illustrative of my invention, 5 designates an engine cylinder lining and 6 the water jacket wall thereof, of a Diesel engine. This wall, as it is shown, may be formed or provided with integral spiral fins 7, which establish a spiral water channel 8 between the fins around the engine lining cylinder 5, but this provision is not necessary to this invention.

On the combined structure of the engine lining cylinder 5 and the water jacket wall 6, the engine head 9 is positioned, being suitably secured in place. This engine head is formed with a combustion chamber 10, which is shaped in parabolic cross section or a combination developed from the assembly of a parabola and a sphere, and is provided with an overlying rib or fin 11, integral with the wall, and which is V-shaped, and which extends downwardly along the vertical wall portion 12 of the combustion chamber. This rib or fin 11 is an accessory to the general construction of the combustion chamber and the other features function independently of the rib or fin. The overlying wall portion 13 curves slightly downwardly toward the fuel injector nozzle 14 and its catalytic distributor 22.

The fuel injector consists of a block 16, which is reduced to provide a nipple 17, and this nipple is formed with a central boss 18, which is formed with a small axial jet or fuel passage 19, which communicates with the injector cylinder and is normally closed by the needle 20, centered in the bore of the injector block. This injector block is suitably secured in place in the engine head 9.

On the nipple 17 the fuel distributor and catalytic agent 22 is coupled, as by means of matching screw threads. This distributor is constructed of pure nickel and is formed with a plurality of lateral ports 23, which are spaced apart circumferentially in equal distances from each other, as shown in Fig. 2. One wall 23a of each of these ports is disposed in angular relation to the circular arc of the distributor, and the other wall 23b is formed with an outer convex relief 23c, and the distances between the confronting walls slightly increases from the bore 24 of the distributor outwardly. The ports are all inclined with reference to the circular form of the distributor, so as to generate a spinning motion to the particles of fuel discharged by the fuel nozzle or injector through the bore 24 of the distributor. This bore is considerably larger than the fuel passage of the nipple, and the ports or openings 23 are disposed continuous to the vertical plane of the end discharge face of the nipple, so that the stream of fuel discharge by the injector nipple will produce a suction within the distributor, which will draw air from the compressed air supply of the combustion chamber through the ports 23 and into the bore of the distributor 22.

The catalytic distributor is formed with a curved inner wall surface 25, and the curvature progressively narrows the fuel passage or bore through the distributor to a point approximately midway of the distance between the extreme outer end of the distributor and the inner edges of the port 23, and then widens in a flatter curvature so that a central Venturi passage is thereby provided in the core of the distributor.

The stream flow of the injected fuel is indicated by the arrows in Fig. 1, the flow being directly against the vertical wall portion 12, where the central fuel particles of the fuel that may reach the V-shaped fin or rib 11, will be deflected back into the ports 23 of the distributor, thereby promoting the maximum mixing effect of the injected fuel charge and the compressed air supply of the combustion chamber.

The fuel stream in flowing through the bore of the catalytic distributor develops a spinning motion, which tends to increase the suctional pull upon the air particles of the combustion chamber, to cause them to move at high velocities through the ports 23. This rapid relative motion of the particles of fuel and air between themselves and against the many surfaces of the distributor, generates a frictional electrical effect which develops an electrostatic field, and this intensifies the catalyzing influence which the pure nickel distributor exercises over the chemical reactions taking place in the combustion chamber between the injected fuel and the oxygen of the compressed air supply.

The effect of this catalytic action is to accelerate the rate of chemical combination, so that in the extremely limited time available between the end of the compression stroke and the starting of the power stroke of the piston, more fuel atoms will combine with more atoms of the contained oxygen, than is otherwise possible. This will result in more complete combustion, and the elimination of smoke comes as a consequence of the complete consumption of the fuel.

The parabolic form of the combustion chamber is more fully developed in Fig. 3, which shows that the combustion chamber is contracted near the fuel injector and distributor, by concave curved walls, resulting from the parabolic surface, which thus provides or promotes the return flow of the fuel charge and the entrapped particles of oxygen to the distributor and catalytic agent.

In Fig. 3 I show a modified arrangement of the catalytic distributor and mixer, which includes a shoulder 22a formed on the rear end of the distributor. Insulation 29 of mica or other suitable material, is arranged around this shoulder and in the rear portion of the bore of the distributor, and the nipple 30 of the fuel injector is tightly fitted in this insulation. The injector is threaded into the engine head, to confine the nipple in its position in the bore of the distributor. By this arrangement the distributor is protected against the loss of heat, and the catalytic function of the distributor is maintained by preventing the dissipation of heat from the distributor, thus insuring the maximum available working temperature.

By offsetting the combustion chamber, with reference to the vertical axis of the engine cylinder bore, as shown in Fig. 4, the piston 31 can move close to the end of the cylinder bore, or to the wall 32, thereby expelling nearly all of the air of the engine cylinder during the compression stroke of the piston. This air is thus forced at tangential velocities into the offset combustion chamber 33, thus greatly increasing the circulation therein, and promoting the fullest mixing action between the fuel particles and the oxygen. As the air supply is thus forced into the offset combustion chamber it flows in a clockwise motion around the horizontal axes of the parabolic combustion chamber to intensify the mixing effect.

The increased circulation of the fuel charge into the offset combustion chamber and the resulting combustion generated therein, aid in bringing the catalytic distributor to the high temperature required for developing the fullest catalytic effect. This temperature rises with the speed of the motor and automatically compensates the lag of combustion.

As the speed of combustion is greatly accelerated by the catalysis developed, the velocity of flame propagation in the combustion chamber is greatly increased, with the result that complete combustion develops and the causes which produce engine knocking noises and a smoky exhaust, are eliminated.

In working Diesel engines which I have built and operated and which embody my invention, I have been able to develop complete combustion within 1/20,000 of a second of time, and with a smokeless exhaust, and with a smooth motor rotating at 4,000 R. P. M., without engine knocking noises.

When the fuel is injected under the high pressure required to penetrate the compressed air supply, the finely divided fuel follows the lines of the arrows shown in Fig. 1. The friction between the fuel and the particles of air polarizes the molecules within the influence of this process, thereby creating a strong electrostatic field inside of the catalytic Venturi distributor. This electrical field attracts free valence electrons from the hot Venturi nickel thus bombardment of atoms and exchange of electrons follows, and this greatly accelerates the speed of chemical reaction between the fuel particles and the oxygen supply in the combustion chamber.

The combustion is complete when the mixture enters the zone Q of the combustion chamber, and here there is produced a local increase of pressure, forcing the air outside of the injector nozzle or jet to flow toward the base of the venturi, where it enters the tangential holes or ports 23 of the distributor. A spiral flow of the mixture is thus generated in the distributor and from the distributor, and this occurs without any significant formation of eddy currents, and with the result that complete mixing follows.

It is understood that I can use any other catalytic metal or material, for example, I may use instead of pure nickel, platinum, polonium or uranium, in the construction of the Venturi fuel tube and distributor. It is also understood that I can locate a catalytic agent in any different location or position in the combustion chamber.

It is also understood that various changes in the design, size and relation of the parts shown, and in the steps of the methods disclosed, may be resorted to, without departing from the scope of this invention, as defined in the claims hereof.

Having described my invention, I claim as new:

1. In an internal combustion engine, a body provided with a cylinder, a cylinder head detachably secured to said body and comprising a combustion chamber opening into said cylinder and a fuel injector leading into said combustion chamber, the latter being of parabolic cross section in an extending plane through the fuel injector axis and perpendicular to the cylinder axis at the end adjacent to the fuel injector and of heart-shaped cross section in the said plane at the opposite end, and a Venturi tube of catalytic material disposed in coaxial arrangement with said fuel injector adjacent the latter in said combustion chamber, said Venturi tube being adapted to operate as mixing member for the gas and air mixture, and a plurality of lateral parts provided in said Venturi tube in order to draw air from the combustion chamber into said tube due to the prevailing suction effect.

2. The internal combustion engine, as set forth in claim 1, in which the inner face of said combustion chamber is provided with a fin extension disposed in a plane through the axis of said cylinder, thereby forcing the air flow in said chamber towards the base of said Venturi-tube to enter the lateral parts of said tube.

3. The internal combustion engine, as set forth in claim 1, in which the said parts provided in the Venturi tube are tapered from the inner to the outer face of the tube.

AUGUSTE LOUIS MARIE ANTOINE ROUY.

REFERENCES CITED

The following references are of record in the file of this patent:

UNITED STATES PATENTS

| Number | Name | Date |
| --- | --- | --- |
| 450,612 | Crowe | Apr. 21, 1891 |
| 580,445 | Bates | Apr. 13, 1897 |
| 991,404 | Woodworth | May 2, 1911 |
| 1,389,337 | Wolfard | Aug. 30, 1921 |
| 1,450,691 | Lowe | Apr. 3, 1923 |
| 1,462,514 | Lowe | July 24, 1923 |
| 1,564,906 | Sokal | Dec. 8, 1925 |
| 1,633,541 | Barren | June 21, 1927 |
| 1,703,202 | Moore | Feb. 26, 1929 |
| 1,719,215 | Faroy et al. | July 2, 1929 |
| 1,820,878 | Wyckoff | Aug. 25, 1931 |
| 1,954,083 | Lang | Apr. 10, 1934 |
| 2,028,749 | John et al. | Jan. 28, 1936 |
| 2,098,031 | Essl | Nov. 2, 1937 |
| 2,104,150 | Bremser | Jan. 4, 1938 |
| 2,106,914 | L'Orange | Feb. 1, 1938 |
| 2,126,442 | Baud | Aug. 9, 1938 |
| 2,292,409 | Steward | Aug. 11, 1942 |
| 2,316,697 | Latta | Apr. 13, 1943 |

FOREIGN PATENTS

| Number | Country | Date |
| --- | --- | --- |
| 467,304 | Germany | Oct. 23, 1928 |
| 567,527 | Germany | Jan. 5, 1933 |
| 816,107 | France | July 30, 1937 |
| 417,306 | Great Britain | Oct. 2, 1934 |